Aug. 13, 1968   R. W. SMITH ET AL   3,397,117
COMPACT SOLAR STILL
Filed June 13, 1966                    2 Sheets-Sheet 1
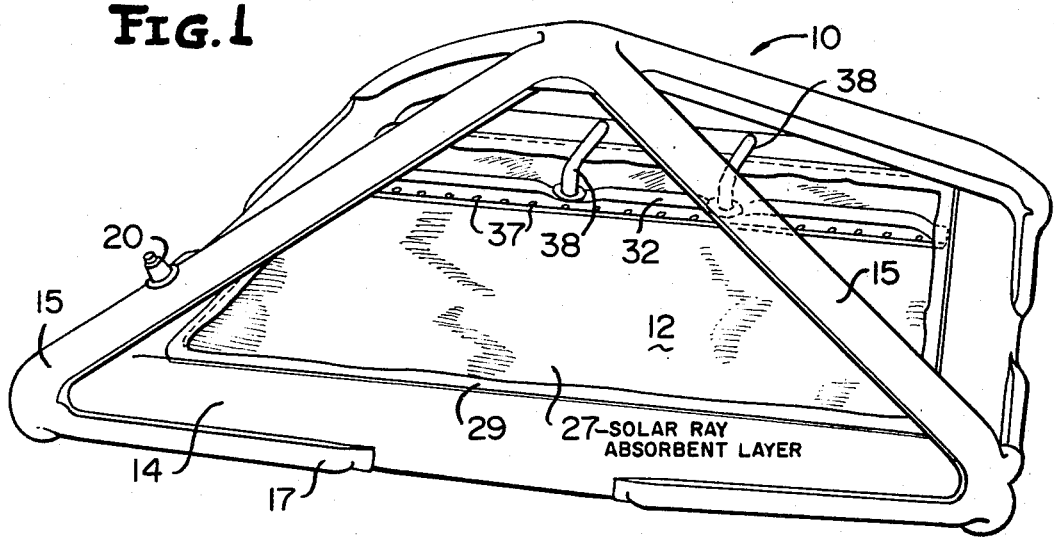
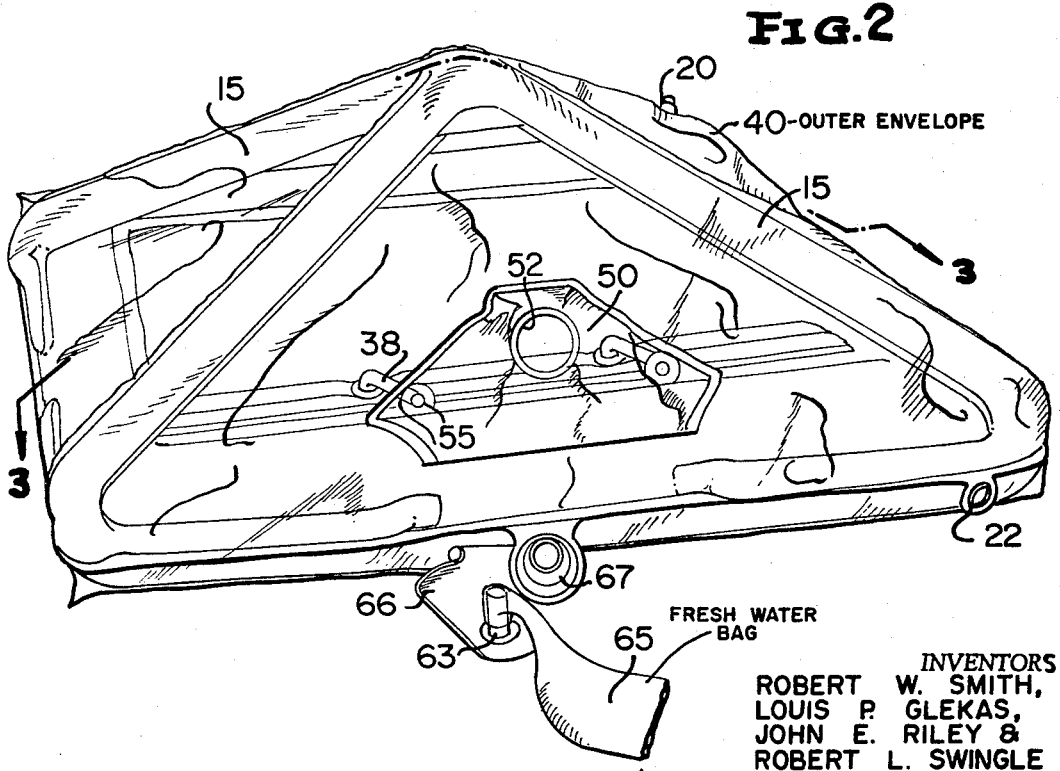
INVENTORS
ROBERT W. SMITH,
LOUIS P. GLEKAS,
JOHN E. RILEY &
ROBERT L. SWINGLE
BY *Hurvitz & Race*
ATTORNEYS

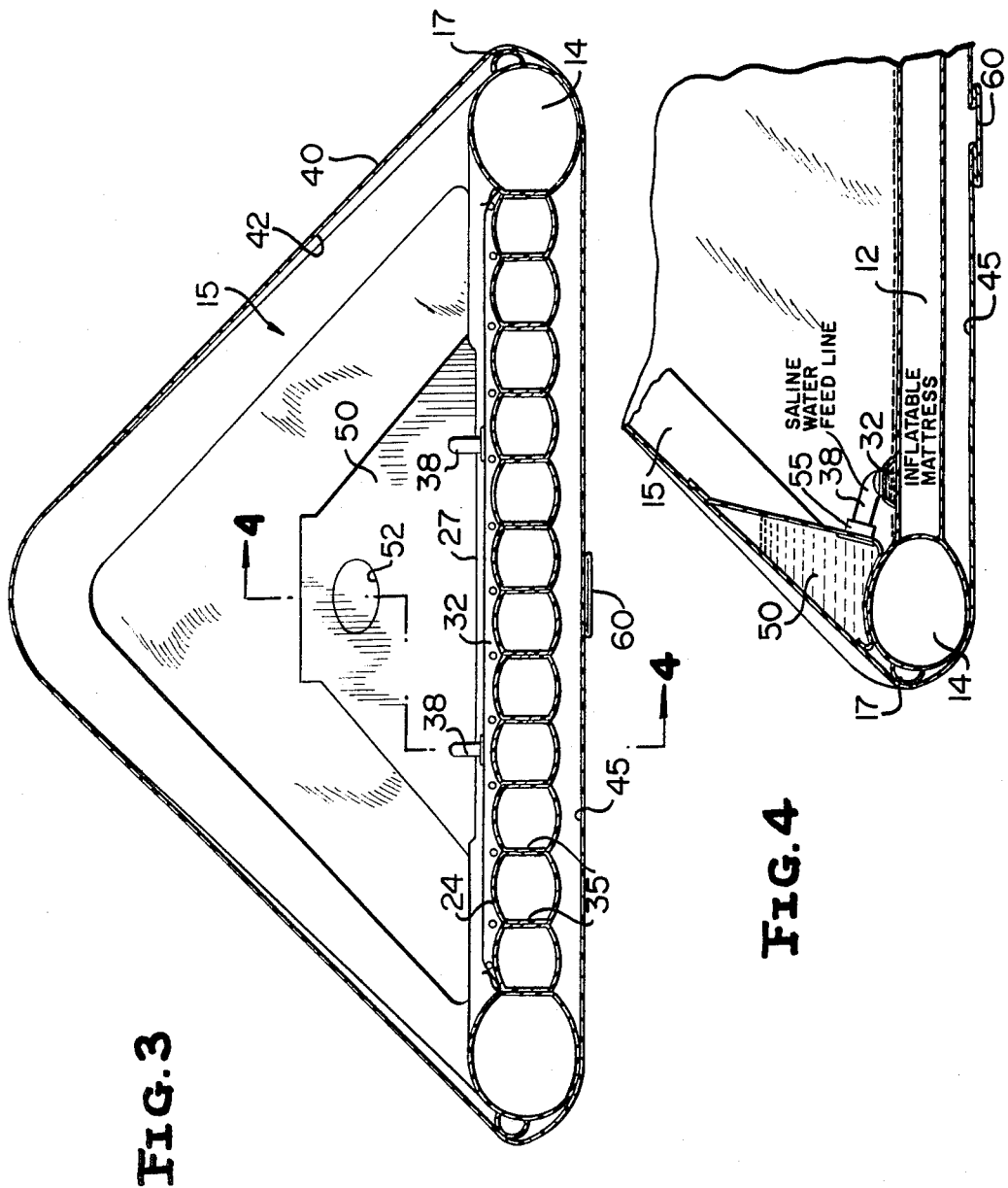

United States Patent Office 3,397,117
Patented Aug. 13, 1968

3,397,117
COMPACT SOLAR STILL
Robert W. Smith, Oakton, Louis P. Glekas, Annandale, John E. Riley, Vienna, and Robert L. Swingle, Woodbridge, Va., assignors, by mesne assignments, to the United States of America as represented by the Administrator of the National Aeronautics and Space Administration
Filed June 13, 1966, Ser. No. 557,016
10 Claims. (Cl. 202—234)

ABSTRACT OF THE DISCLOSURE

A solar still for converting saline or brackish water to potable water has an inflatable frame which includes an inflatable mattress base with integral inflatable ribs extending in pyramidal configuration from the corners of the mattress to a common junction above approximately the center of the mattresses. A solar radiation transparent envelope is disposed about, and when the frame is in its inflated condition, is supported by the frame. The envelope provides, at the underside of the mattress, a lower collection basin for the condensate which forms on the inner surface of the envelope as solar radiation penetrating the transparent walls of the envelope heats a black radiation-absorbing evaporator layer to which the water to be distilled is fed from a pouch or bag in a wall of the envelope.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

The present invention relates generally to saline water conversion, and more particularly to apparatus adapted to utilize solar radiation for converting salt water and brackish water into potable water.

It is a principal object of the present invention to provide an improved solar still.

Prior art solar stills may be divided into two broad classifications. The first, the land based still, is designed for maximum efficiency when operating in a fixed position and is generally too bulky and heavy to be utilized in sea-going applications. Sea based stills, constituting the second broad class, of which a wide variety have been developed in the prior art, are typically characterized by efficiencies much lower than those of the land based type because of their necessarily portable nature leading to the use of inferior materials and restrictions on design. Obviously a lightweight compact still for sea-going use is not readily adaptable to rugged construction; yet it must be capable of withstanding environmental conditions, such as heavy seas and high winds, which are generally much more severe than conditions occurring on land.

Typically, the prior art solar still comprises an evaporator-absorber on which the liquid to be distilled is distributed, a superposed condensing surface which also acts to transmit the incident solar radiation, and a trough or tray to collect the condensed distillate. Since it is important that a high percentage of the incident solar radiation be transmitted to the evaporator-absorber, in order that sufficient heat be delivered to the liquid residing thereon to result in vaporization, it follows that reflective properties must be minimized. Maximum efficiency requires, among other things, that the condensing surface be wettable, i.e. that the water condense in the form of a film on the interior surface rather than as droplets which are highly reflective.

At present most sea based stills are of the inflatable type, typically having the shape of a balloon and requiring a considerable volume of air for inflation. Such stills are exceedingly vulnerable to puncturing, cracking, and tearing as a result of collisions with floating objects and/or exposure to environmental extremes. Moreover, the usual construction of conventional sea-based stills is such that the collected distillate is not adequately isolated from the saline water, resulting in relatively frequent admixing of the two under all but extremely calm conditions.

Accordingly, it is a more specific object of the present invention to provide a compact solar still having features of construction adapted to overcome one or more of the aforementioned disadvantages of prior art solar stills.

It is another object of the invention to provide a solar still which operates at high efficiency in either land or sea use.

Briefly, according to the present invention, the improved solar still is comprised of two basic sections; the first an inflatable frame requiring only a relatively low volume of air for inflation and carrying the evaporator-absorber, and the second an outer envelope supported by the frame and acting as a condenser-collector. In addition to its function as a component of the still, the outer envelope serves to protect the frame or skeletal support structure from direct contact with foreign objects that might otherwise cause punctures or tears in the inflatable material. The support structure includes an air mattress base integrated with a pyramidal rib structure, so that a single inflation port may be used to erect both. When inflated the base and rib structure form a rugged skeleton to support the condenser-collector envelope, serve as a supporting surface for the evaporator-absorber, form a buoyant mass to permit floating of the still in the sea, serve as a heat insulator between the solar radiation-absorbing material and the body of sea water in which the still is floating, and support a saline water reservoir, a feeder, and a collection bag.

The compact and rugged construction of the solar still to be disclosed herein make it suitable for use in either land based or sea-going operations. In the latter case, the two section construction renders the still ideally suited as a temporary life preserver, in that the outer envelope may readily be removed to permit survivors to grasp or to be supported by the inflated rib structure.

Additional features and advantages of solar stills embodying concepts and principles of the present invention include removability of the evaporator-absorber for cleaning, higher efficiency and productivity and lighter weight.

The above and still further objects, features and attendant advantages of the present invention will become apparent from a consideration of the following detailed description of an exemplary embodiment thereof, especially when taken in conjunction with the accompanying drawings, in which:

FIGURE 1 is a perspective view of the inflated skeletal support structure;

FIGURE 2 is a perspective view of the structure of FIGURE 1 with the outer envelope supported thereon;

FIGURE 3 is a sectional view of the still taken through the reservoir and collection tube of the structure of FIGURE 2; and FIGURE 4 is a fragmentary sectional view of the still showing the ribbed structure of the air mattress base.

Referring now to the drawings, wherein like reference characters designate like components in the several figures, the skeletal support structure or frame 10 is composed of plastic and includes an inflatable mattress base 12 having sides 14 which inflate to greater thickness, and from the corners of which extend integral inflatable ribs 15 in a pyramidal configuration joined at a point above the base 12 lying substantially along the vertical axis thereof. Inflatable appendages 17 extend from the corners of sides 14 along a portion of the length thereof for reasons which will be explained presently.

The entire structure thus far described is inflatable from a single port or valve 20 which may be located at any convenient point on the exposed surface of the frame, preferably on one of the ribs 15 to permit ready access for inflation at sea. Nominal inflation pressure for a support structure of the type described has been found to be approximately one-half to one pound per square inch gauge (p.s.i.g.). This represents a considerable reduction in inflation pressure, and in volume of air required, over prior art inflatable stills. As a consequence, survival personnel are required to exert a very minimal effort in erecting the still. Since the support structure is of the inflatable type, the still may be stored in a flat compact form until ready for use. In sea based operations, the still may be stored along with other necessary equipment in a lifeboat or liferaft for use in survival at sea. A fastening ring 22 may be attached to a side 14 of the frame to permit securing of a line for towing behind a boat or raft.

On the surface 24 of the mattress base 12 which is to be positioned upwardly relative to the land or sea, as the case may be, when the still is in use, there is disposed a black, solar radiation-absorbing layer 27 which may be composed of any of the fabrics conventionally utilized for such purpose, such as fibrous polyacrylonitrile. Layer 27 may be retained in position in mattress surface 24 by flaps 29 extending inwardly from sides 14 and parallel to that surface.

A plastic feeder channel or tube 32 is attached in any convenient and conventional manner to layer 27, the channel being oriented perpendicularly to the inner ribs 35 of mattress base 12 and having a plurality of apertures 37 arranged in a row therealong. Saline water feed lines 38 which may be composed of plastic project from channel 32 toward the upper portion of a side 14 to permit introduction of the liquid to be distilled into the feed channel. The sea water then flows out of the apertures 37 parallel to mattress ribs 35, the latter forming surface channels to facilitate the flow and even distribution of the salt water along layer 27.

Outer envelope 40 is disposed about support structure 10 and may comprise a transparent or translucent plastic sheet. A seal is provided at the intersection of inflation port 20 and envelope 40 to permit inflation of the skeletal frame when the envelope is in position about the frame. Outer envelope 40 has several functions, basic among which is that it acts as a condensing surface for fresh water evaporated from the evaporator-absorber layer 27 (or simply evaporator-absorber), and as a collecting basin for the distillate as it runs off the inclined interior condensing surface of the envelope. The upper portion of envelope 40, i.e., that portion covering pyramidal ribs 15 and the open spaces or windows therebetween, functions as the condenser and, to this end, its inner surface is treated chemically or mechanically in a conventional manner to render that surface wettable. For example, envelope 40 may have its inner surface suitably roughened to render the surface water wettable, this technique being well known in the art.

The lower interior surface 45 of envelope 40 serves as the distilled water collection basin and completes the enclosure of the inflated support structure on the underside. It will now become apparent that the purpose of the inflated appendages 17 located at the base of each of the support ribs 15 is to insure separation of the condenser surface from the insulator base and, thereby, that the condensed distillate will run off the inclined sides of the condenser into the collection basin.

It may be noted at this point that the outer envelope 40 provides what may be referred to as a "second" skin for the still, protecting the skeletal support structure against punctures or tears upon collision of foreign bodies with the still. Since the envelope is not itself under pressure, any punctures therein are readily sealable, as with patching tape, with little likelihood of subsequent failure at the repaired portion. On the other hand the prior art inflatable still suffers a significant drawback in that punctures in the pressurized material are difficult to repair and are thereafter relatively unreliable.

The upper portion of the envelope includes a reservoir 50 positioned at a window between support ribs 15 adjacent the saline water feed channel 32. The reservoir may be conveniently fashioned by heat sealing another portion of plastic sheet to the interior or exterior surface of envelope 40 to form a pocket for holding the saline water. A hole 52 is provided in the exposed surface of the reservoir by which it may be filled. The interior wall of reservoir 50 is provided with a pair of coupling ports 55 adapted to mate with feed lines 38 to allow liquid, such as seawater, from the reservoir to run into feed channel 37 and thence to flow into and over evaporator-absorber 27.

In the operation of the solar still, the seawater is fed into reservoir 50 where, as previously stated, it is eventually directed to the black evaporator material. The presence of the four inclined windows between support ribs, covered by the radiation-transmissive outer envelope, allows solar radiation to impinge on the evaporator surface, despite random orientation of the still relative to the sun's rays. The solar radiation is absorbed by the evaporator 27, thereby heating the seawater which is also substantially absorbed by the evaporator to vaporization temperatures, whereupon the fresh water evaporates leaving a salt (and other material) precipitate deposited on the evaporator.

The water vapor condenses on inner surface 42 of the envelope as a thin film, rather than as droplets, by virtue of the wettable character of that surface. The condensate runs off the inclined surfaces of the condenser film of the inflated still, between the appendages 17 and into the collection trough or basin formed by the envelope surface 45. The fresh water may be removed from the collection basin by provision of a feeder tube 60, simply a folded and edge-sealed plastic sheet having an opening into the basin, draining at approximately the center of undersurface 45. The opposite end of feeder tube 60 may be provided with an outlet port 63 to which a fresh water collection bag 65 may be coupled at periodic intervals when it is desired to empty the basin. During those periods that the basin is not being emptied the feeder tube 60 may be coupled to a seal fixture 67 attached to a side 14 to stow the tube and to prevent seawater from entering the tube and contaminating the fresh water reservoir.

As previously stated, when used at sea the solar still described herein makes a very convenient temporary life preserver, should an emergency arise, by simple removal of outer envelope 40. Support ribs 15 then provide a means by which the surviving personnel may be secured to the preserver.

It has also been mentioned earlier in the disclosure that the compactness, ease of inflatability and of operation of solar stills in accordance with the present invention make such stills well suited to land based operation as well as sea duty. Such stills may for example be used among survival equipment for light planes, for camping equipment emergency use, and, in short, in any application where a source of brackish water exists and where it is desirable or necessary to convert such water to potable water.

While we have disclosed a particular embodiment of our invention, it will be clear that variations of the details of construction which are specifically illustrated and described may be resorted to without departing from the true spirit and scope of the invention as defined in the appended claims.

We claim:

1. A solar still comprising an inflatable skeletal support structure, said support structure including an inflatable mattress base, and a plurality of ribs extending from sides of said base and commonly inflatable therewith, each of said ribs joined at a common end opposite the end from which each extends from said base;

evaporator-absorber means disposed on said base to receive solar radiation when said still is oriented for operation; and a plastic radiation-transmissive envelope disposed about said support structure, said envelope including means for supplying liquid to be distilled to said evaporator-absorber means and having a wettable condensing surface disposed opposite said evaporator-absorber means, said envelope further providing a collection basin for distillate.

2. The combination according to claim 1 wherein said mattress base is ribbed, and said plurality of inflatable ribs extend in pyramidal configuration from respective corners of said mattress base to a point substantially centrally located above a surface of said mattress base, said evaporator-absorber means comprising a black solar radiation-absorbing fabric disposed on the last-mentioned surface and exposed to the sun via open spaces between said ribs.

3. The combination according to claim 2 wherein a liquid feeder channel is disposed adjacent said fabric for distributing the liquid to be distilled thereon; and wherein said means for supplying includes a reservoir, and liquid feed tubes coupling said reservoir to said feeder channel.

4. The combination according to claim 2 wherein is further included inflatable appendages along the sides of said mattress base for providing a flow path for said distillate between said condensing surface and said collection basin, said basin being located at the undersurface of said mattress base relative to the surface on which said fabric is disposed.

5. The combination according to claim 4 wherein is further included means for emptying the contents of said collection basin.

6. A solar still comprising an inflatable frame, including an inflatable mattress base having a central portion and sides, said sides having a greater thickness in the inflated condition than said central portion, and inflatable ribs extending from said sides to a common juncture above said central portion; a solar radiation absorber disposed on the surface of said central portion above which said common juncture lies; means for applying liquid to be distilled to said absorber; and a transparent envelope surrounding said frame and having a condensing surface disposed adjacent said absorber and forming a collection basin adjacent the opposite surface of said central portion.

7. The invention according to claim 6 wherein each of said frame and said envelope is composed of plastic.

8. The invention according to claim 7 wherein said ribs are integral with said base, said base having a generally rectangular shape, said ribs extending respectively from the corners of said base, said corners including projections for spacing said envelope from the sides of said base, the interior surface of said envelope being wettable.

9. The invention according to claim 8 wherein said absorber comprises a layer of black fabric; and wherein said liquid applying means comprises a liquid reservoir pouch in a wall of said envelope, a liquid permeable channel contiguous with an edge of said fabric layer to feed liquid thereto, and a liquid supply line between said pouch and said channel.

10. The invention according to claim 9 further including an outlet port communicating with a substantially centrally located area of said collection basin for withdrawal of distillate liquid from said basin.

References Cited

UNITED STATES PATENTS

| 2,398,292 | 4/1946 | Delano | 202—234 |
| 2,402,737 | 6/1946 | Delano | 203—10 |
| 2,412,466 | 12/1946 | Miller | 202—234 |
| 2,427,262 | 9/1947 | Delano | 202—185 |
| 2,445,350 | 7/1948 | Ginnings | 202—172 |
| 2,455,835 | 12/1948 | Ushakoff | 202—234 |

FOREIGN PATENTS

| 221,572 | 5/1959 | Australia. |

NORMAN YUDKOFF, *Primary Examiner.*

F. E. DRUMMOND, *Assistant Examiner.*